Patented June 3, 1952

2,598,745

UNITED STATES PATENT OFFICE 2,598,745

SMELTING OF ZINCIFEROUS ORE

Erwin C. Handwerk, Lehighton, and Luther D. Fetterolf, Palmerton, Pa., assignors to The New Jersey Zinc Company, New York, N. Y., a corporation of New Jersey No Drawing. Application August 25, 1950,
Serial No. 181,577

6 Claims. (Cl. 75—14)

This invention relates to the smelting of zinciferous ore and, more particularly, to the electric furnace smelting of such ore.

Electric furnace smelting of zinc offers many attractions including simplicity of charge preparation and furnace operation as compared to those zinc smelting practices now in use. There have been innumerable proposals presented heretofore for the electric furnace smelting of zinciferous ores wherein a dry charge of the ore and reducing material is melted down with the concomitant liberation of metallic zinc vapor, but to the best of our knowledge no such operation has ever been put into commercial practice. It has been the experience of those who have tried these prior art proposals even on a small scale that the zinc vapor-bearing gases so produced could not be condensed without obtaining an excessive amount of blue powder or zinc dust, or both, and that the smelting operation itself was characterized by low zinc elimination from the charge and by non-continuous operation.

We have now discovered that it is possible to smelt oxidic or oxidized zinciferous ores in the presence of significant amounts of iron and copper or precious metals, or both, on a commercial scale in an electric arc furnace with the resulting production of metallic zinc vapor capable of being condensed predominantly to massive zinc metal and with the concentration of copper and precious metals in a form from which they may be recovered by conventional means. We have found that this result can be attained by control of a combination of smelting conditions. These critical smelting conditions reside in an important relationship in the charge composition, including the presence of a certain amount of sulfide sulfur, and in the manner in which the smelting is effected. Control of these critical conditions makes possible the smelting of a zinciferous ore with a carbonaceous reducing material in an electric arc furnace with the resulting production of molten matte, a substantially zinc-free molten slag and a metallic zinc vapor capable of being condensed predominantly to massive zinc metal. Our smelting method comprises establishing in an oxidized zinciferous ore charge containing significant amounts of iron and copper, silver or gold, or combinations thereof, an amount of sulfide sulfur sufficient to form a matte with substantially all of the copper or precious metals, or both if present, and with at least a portion of the iron, further establishing in the charge composition an amount of the reducing material sufficient to reduce all of the zinc oxide and advantageously, but not necessarily, at least a portion of that iron oxide which has not been sulfided by said sulfur, introducing the charge into the furnace in a loose dry condition, generating the smelting heat for this reduction within the furnace by an electric arc in contact with the body of molten slag, and effecting the reduction in a smelting zone above the body of molten slag and out of direct contact with the heating arc whereby smelting of the charge is effected at a temperature not in excess of 1450° C.

Oxidic zinciferous ores generally comprise zinc, cadmium, lead and iron which are often accompanied by significant quantities of copper, silver or gold, or combinations thereof. The oxides of these metals, with the exception of the gold which usually appears as the native metal in such ores, are readily reducible by solid carbonaceous material at temperatures within the range of about 1100°–1400° C. The gangue constituents of the ores comprise oxides of calcium, magnesium and silicon which are not readily reducible under these conditions. While smelting temperatures in the range of 1100°–1400° C. can readily be obtained in an electric furnace, it is characteristic of conventional electric furnace technique that a substantial portion of the charge is heated to an appreciably higher temperature than that of the general mass of charge. Smelting temperatures substantially above 1450° C. can be avoided if the charge is smelted out of direct contact with the furnace arc, the furnace heat being provided largely by radiation from an arc struck between the furnace electrodes and a body of the molten slag obtained upon smelting of the charge. However, even with this method of smelting the charge there is a pronounced tendency for significant quantities of the slag-contained lime, magnesia and silica to be reduced by the high arc temperature if the slag contains an appreciable amount of available carbonaceous reducing material. Inasmuch as we have found that the reduction of these gangue constituents leads to their volatilization and subsequent appearance as dust-like particles of the corresponding oxides which appear to promote the formation of physical and chemical blue powder in the zinc vapor condenser, reduction of the gangue constituents should be scrupulously avoided.

In order to insure the absence of carbonaceous reducing material available for reduction of the gangue constituents of the molten slag in the vicinity of the heating arcs, we have previously found that the amount of reducing material should be so correlated with respect to the aforementioned readily-reducible metal oxides as to leave unreduced a certain portion of the iron oxide. Under these conditions, virtually all of the other readily-reducible metal oxides will have been reduced to the metallic state while a small amount of iron oxide remains unreduced. On the other hand, an excessive amount of iron oxide in the slag cannot be tolerated for the reason that the resulting slag is so oxidizing in character that it tends to decarburize the molten pig iron product which is produced in the course of the smelting operation and which underlies the molten slag. Decarburization of the pig iron raises its melting point and tends to immobilize the metallic iron within the furnace. Accordingly, in order to obtain a zinc vapor capable of condensation predominantly to massive zinc metal and to obtain a tappable pig iron byproduct from the smelting of a substantially completely oxidic zinciferous ore, the amount of carbonaceous reducing material present in the charge should be so correlated with respect to the other components thereof as to leave unreduced in the slag between about 1½% and about 6% by weight of iron oxide (calculated as Fe).

We have now found, however, that such careful control of the iron oxide content of the slag can be substantially eliminated if the charge composition is so adjusted as to contain an amount of sulfide sulfur sufficient to form iron sulfide with at least a portion of the iron content of the charge and a matte with substantially all of any copper, silver and gold present in the ore. Under these conditions, we have found that the resulting molten iron sulfide holds substantially all of the copper, silver and gold in a readily recoverable form, thus leaving the cadmium and lead free to be volatilized along with the zinc, and that the mechanics and chemistry of the smelting operation are not adversely affected by the iron oxide content of the slag. However, we have found it advantageous to introduce some metallic iron into the matte, the free iron functioning as a reducing agent for any zinc sulfide dissolved in the matte. The introduction of at least some reduced iron into the matte thus tends to minimize the presence therein of the zinc component of the charge. Accordingly, the charge composition may not only be so established as to contain an amount of sulfur sufficient to form a matte with substantially all of any copper, silver and gold therein and with at least a portion of the iron, but the charge composition may advantageously be so further correlated as to leave at least a portion of the iron unsulfided and to establish therein an amount of the carbonaceous reducing material sufficient to reduce all of the zinc oxide of the charge and at least a portion of that iron oxide which has not been sulfided by the sulfur component of the charge. If the amount of metallic iron so produced exceeds that amount which will replace zinc sulfide in the matte and still further exceed the limit of solubility of the metallic iron in the matte, this excess of molten iron will collect in a body underlying the matte layer. Inasmuch as the metallic iron is formed in the smelting zone in the presence of carbonaceous reducing material, the metallic iron will be carburized as it forms. In its carburized form, known as pig iron, the iron product will be molten at the prevailing furnace temperature so that the iron will settle and coalesce. Inasmuch as even a very thin supernatant layer or film of the matte will protect this body of pig iron from decarburization by even a highly oxidizing type of slag, it will be apparent that the magnitude of the iron oxide content of the slag is of no consequence in such smelting practice.

The smelting method of our invention is applicable to any oxidic zinciferous ore whether naturally occurring in the oxidized state or obtained by roasting blende. If the ore contains a significant amount of iron and one or more of the metals copper, silver and gold, the necessary sulfur may be obtained from an extraneous source if the ore itself is free of sulfur or has been dead roasted, or the required sulfur may be derived from the ore, if the ore is a sulfide, by terminating the roasting thereof short of completion. Accordingly, the expression "establishing" in the charge a certain sulfur content, as used herein and in the claims, shall be understood to include adjusting the indigenous sulfur content of an ore as well as adding sulfur from an extraneous source as described more fully hereinafter. Such a sulfur content of the charge will, of course, be understood to comprise that sulfur over and above any sulfur which will be sequestered by lime in the slag. It will be appreciated, accordingly, that the source and nature of the zinciferous ore is not a critical consideration. In fact, zinciferous ores of all types and origins, ranging in zinc content from about 20% to over 65%, can be smelted pursuant to the practice of our present invention.

Smelting temperatures not in excess of 1450° C. can be established in a zinciferous charge in an electric arc furnace when the charge is heated essentially by radiation from an arc struck from an electrode which terminates above the upper surface of the slag and by contact with the body of hot slag which is produced in the course of the smelting operation and which is not permitted to exceed a temperature of 1450° C. when measured as the temperature of the slag as tapped from the furnace. We have found that a zinciferous charge can be smelted effectively under these conditions while the charge floats, in the form of a loose mass of discrete particles and out of direct contact with the heating arc, on the surface of the slag which is maintained fluid at temperatures of at least about 1100° C. The smelting appears to take place essentially in a zone above the surface of the slag, some smelting occurring at the charge-slag interface and some smelting in the charge bank immediately thereabove. The smelting operation is endothermic and, as a result, the fresh charge has a high capacity for the absorption of heat from the arc and from the surface of the slag both by contact and by virtually black body radiation conditions. This endothermic absorption of heat from the slag and arc serves to control the temperature of the slag and unsmelted charge and makes possible the maintenance of smelting conditions wherein the temperature does not exceed the maximum 1450° C. temperature of the slag.

The reducing materials useful in practicing our invention are those solid carbonaceous materials conventionally used in metallurgical smelting operations. Coal and coke may be used with particular advantage and preferably in the form of particles ranging from a maximum of about ½ inch in diameter down to those of dust coal. The amount of carbonaceous material used in practicing our invention should be such as to effect substantially complete reduction of the zinc oxide of the ore, along with the relatively small accompanying amounts of the readily-reducible lead and cadmium oxides. In the preferred operation pursuant to our invention, the amount of carbonaceous material incorporated in the charge should be also sufficient to reduce at least a portion of that iron oxide component of the charge which is not sulfidized by the sulfur component thereof. Control of the amount of carbon in the charge may be effected by occasional analysis of the slag, the correct proportion of carbon in the charge pursuant to our preferred operation being indicated by the presence of at least about 0.5% of iron in the slag in the form of iron oxide. It must be understood, however, that successful practice of the smelting method of our invention includes charge correlation of the reducing material such as to leave virtually no free iron oxide in the slag, although, as previously explained, the amount of reducing material should not be so great as to leave in the slag an amount of free reducing material such as to promote volatilization of the condenser dust-forming gangue constituents.

The sulfide sulfur component of the charge will generally be indigenous to the ore, as in the case of a sulfide ore which is roasted short of dead-roast conditions so as to leave therein an amount of sulfide sulfur conforming to the aforementioned prescription. The same result can be achieved by admixing a dead-roasted or naturally-occurring oxidic ore with an unroasted sulfidic ore in such proportions as to provide the desired amount of available sulfur. Moreover, in the case of naturally occurring oxidic zinciferous ores which contain copper, silver or gold, or mixtures thereof, without an adequate amount of iron to form a matte, pyrites may be added to the ore to supply the needed iron and sulfur. If pyrites is added for this purpose, its labile sulfur will be removed by the preheating step, discussed further herein, which we have found to be particularly advantageous in practicing the invention.

In the course of the smelting operation, the zinc, cadmium and lead oxides are readily reduced to metallic form at the prevailing furnace temperature. However, we have discovered that, compared to the other readily-reducible components of the zinciferous ore, iron oxide is reduced with somewhat more difficulty at temperatures not exceeding about 1450° C. This means that virtually all of the zinc oxide, cadmium oxide and lead oxide in the charge can be reduced while some iron oxide remains unreduced. The presence of unreduced iron oxide in the slag is, accordingly, not inconsistent with substantially complete elimination from the slagged charge of the other readily-reducible oxides. As mentioned hereinbefore, we have found that the presence of such residual iron oxide in the slag can be used as an indication that at least some of the iron content of the charge remained unsulfidized and was available for reduction to introduce elemental iron into the matte. Thus, we have discovered that if the zinciferous charge to the electric furnace is accompanied by sufficient sulfur, with relation to the proportions of carbon and readily-reducible metals in the charge, as to form a molten matte and a molten slag substantially free from unconsumed reduction carbon, virtually all of the zinc component of the ore can be reduced without raising the temperature of the smelting charge above 1450° C. and without producing objectionable quantities of dust-forming constituents which hinder condensation of the zinc vapor predominantly to massive zinc metal. Incidentally, it has been our experience that when all of the zinc component of the ore has been reduced, virtually all of the cadmium and lead in the ore will also have been reduced, any copper, silver and gold in the charge being concentrated in the matte.

In the course of the smelting operation, at least a portion, and generally a major proportion, of the iron component of the charge is separated in the form of a matte which collects any copper, silver and gold present in the charge, and virtually all of the zinc component of the ore is removed as metallic zinc vapor which carries with it the lead and cadmium components of the ore. As a result, only gangue constituents remain as the slag, these gangue constituents being supplemented by whatever amount of iron oxide is deliberately allowed to remain therein. The gangue constituents consist predominantly of lime and silica in the case of most zinciferous ores and are generally accompanied by relatively small amounts of magnesia and alumina, augmented by the presence of similar gangue-like constituents present in the coal ash. The relative proportions of these slag-forming constituents, including the iron oxide which exerts a pronounced fluidizing influence, should be so controlled as to produce a slag having a sufficient fluidity to permit the ready settling therethrough of molten matte at a rate at least as high as that at which the matte is produced in the smelting zone within the normal operating temperature range of about 1100° to 1450° C. A slag fluidity of this order facilitates distribution therethrough of heat generated at the arc, and the resulting uniform slag temperature conditions contribute to an important extent to our ability to smelt zinciferous ores in an electric arc furnace with the production of metallic zinc vapor capable of being condensed predominantly to massive zinc metal.

Smelting of the dry charge in a zone above the body of molten slag and out of direct contact with the heating arc dictates charging of the furnace through inlets positioned above the slag layer and away from the electrodes. Charging through the furnace roof adjacent the furnace side walls satisfies these requirements provided the charge is introduced at such a rate, with respect to its angle of repose and the furnace geometry, as to form an inwardly and downwardly sloping bank of charge which terminates at the surface of the slag body out of direct contact with the arc formed between each electrode and the slag body. After the charge bank has developed, subsequent charges introduced through the furnace roof slide down the face of the bank and are delivered largely to the surface of the molten slag body. The charge on the face of the bank is heated to smelting temperature by radiation from the arc, and also by the heat transmitted thereto from the slag. General overheating of the slag by the arcs is prevented largely by the absorption of heat by the reducible material in the charge in contact with the slag. This absorption of heat tends to cool the surface of the slag and thereby provides a temperature-controlling buffer which prevents the development in the charge of a smelting temperature significantly in excess of about 1450° C. Accordingly, the manner in which the fresh charge is smelted and is in turn used as a temperature-controlling medium in accordance with our invention is particularly conducive to the liberation from the smelting zone of metallic zinc vapor capable of being condensed predominantly to massive zinc metal.

The only requirement for the physical form of charge used in practicing our invention is that it be loose and dry. By "loose" we mean that the charge should not be introduced in massive form, say, for example, as large sintered blocks or the like. The charge should be loose so that it will flow freely over the surface of the charge bank and down to the surface of the slag layer, varying degrees of subdivision ranging from particle sizes as large as about ½ inch in diameter down to particle sizes which begin to introduce dusting problems. By specifying that the charge should be "dry" we mean that it should not be added in the molten condition. It is a characteristic feature of the smelting method of our invention that the charge be smelted above the surface of the hot fluid furnace slag, and this condition can be met only when the charge is introduced into the furnace in the aforementioned loose dry form.

We have found that condensing efficiency, expressed in terms of the amount of molten zinc metal obtained with respect to the amount of zinc charged to the furnace, can be materially improved by preheating the furnace charge. This preheating has no perceptible effect upon the smelting operation per se except for a reduction in the power required for smelting. The improvement in condensing efficiency by preheating the furnace charge appears to be attained as a result of control of the furnace gas temperature. When a cold charge is introduced into the furnace, the smelting gases rising adjacent the bank of charge are chilled by the relatively cool charge. Carbon monoxide, the predominating non-condensable component of the furnace atmosphere, is known to dissociate extensively into carbon dioxide and carbon at temperatures of the order of 900°–1000° C. Accordingly, it appears that the carbon monoxide-containing smelting gases rising in contact with a relatively cool furnace charge are chilled to that temperature range within which the carbon monoxide tends to dissociate. The resulting production of carbon dioxide causes immediate oxidation of zinc vapor which appears in the condenser as zinc dust. We have found, however, that preheating of the charge to a temperature of at least 500° C. at the time of its introduction into the furnace permits the charge to be heated in the presence of the rising smelting gases without chilling these gases to such an extent as to lower their temperature to the carbon monoxide-dissociating temperature range or to a temperature at which carbon dioxide already present in the furnace atmosphere will oxidize the zinc vapor.

More drastic preheating of the charge, i. e. to a temperature of at least 800° C., will still further lower the carbon dioxide content of the furnace gases in an additional manner. Any ferric oxide introduced into the furnace with the charge is reduced by contact with carbon monoxide in the furnace atmosphere, the carbon monoxide being transformed to carbon dioxide. But if the ferric oxide can be prereduced prior to introduction into the furnace, its reduction product (ferrous oxide) does not produce objectionable amounts of carbon dioxide when exposed to carbon monoxide in the smelting operation. Thus, we have found that by preheating the ore-coal charge to a temperature of at least 800° C., the aforementioned pre-reduction is effected with attendant advantages in the condensation of the zinc vapor from the smelting gases. To obtain the full measure of this advantage, the preheated charge should be transferred to the smelting furnace with a minimum of cooling or other exposure in an oxidizing atmosphere which tends to reoxidize the iron.

We have also found that if extraneous lime (CaO) be admixed with the charge components prior to preheating, the preheating operation, which effects combustion of some of the carbon in the charge, tends to form carbon dioxide which in turn carbonates the lime component of the ore. This carbonation of the lime introduces into the furnace a readily available supply of carbon dioxide which, as emphasized herein, is to be avoided wherever possible. Accordingly, we have found it advantageous not to add to the charge subjected to preheating any extraneous lime which may be added for fluxing purposes.

Condensation of the zinc vapor-bearing smelting gases produced in accordance with our invention can be readily accomplished with high efficiency. Although the zinc vapor may be effectively condensed in stationary baffle-type condensers such as that described in the United States patent to Bunce No. 1,873,861, condensation can be effected with particular advantage in a condenser of the type wherein the zinc vapor is brought into intimate contact with a relatively large freshly exposed surface of molten zinc. The latter type of condenser is represented by that wherein the zinc vapor-bearing gases are passed through a shower of molten zinc forcibly hurled through a confined condensing zone as described in United States Patents Nos. 2,457,544 through 2,457,551, 2,494,551 and 2,494,552. This latter type of zinc condenser is capable of removing and condensing to molten metal all of the zinc vapor contained in the smelting gases except for that amount of the vapor corresponding to the vapor pressure of molten zinc at the temperature of the exhaust condenser gases.

When smelting zinciferous ores in an electric furnace pursuant to our invention, the temperature of the carbon monoxide-containing furnace gases may pass through the range wherein the carbon monoxide tends to dissociate appreciably into carbon dioxide and carbon. The carbon dioxide, being a powerful oxidizing agent for zinc vapor, tends to produce rock oxide accretions and blue powder. If, however, an appreciable amount of nascent carbon is suspended in the furnace gases the presence of carbon dioxide therein can be substantially completely eliminated. Such a suspension of nascent carbon in the furnace atmosphere may be obtained by introducing into this atmosphere an amount of a crackable hydrocarbon such that when it is cracked in situ at the prevailing furnace atmosphere temperature it will yield a cloud of soot-like particles of nascent carbon. The carbon particles, being both nascent and incandescent as they float through the furnace gases, appear to be phenomenally effective in reducing the carbon dioxide content of these gases.

The crackable hydrocarbon must be introduced into the furnace atmosphere for cracking in situ therein and not into the smelting zone where it could be preferentially consumed in the smelting operation. For example, the crackable hydrocarbon may be introduced in the form of liquid fuel oil, kerosene, gas oil, or the like, by allowing it to drip into the furnace atmosphere. A permanent crackable gas, such as natural gas, acetylene, or the like, may also be introduced through a tube into the interior of the furnace atmosphere. Particularly effective results have been obtained by introducing the crackable hydrocarbon in an ostensibly solid form as the volatile component of bituminous coal. When some of the anthracite coal or coke used as the reducing material for the smelting operation is replaced by the equivalent amount of bituminous coal based on its solid carbon content, the volatile matter in this bituminous coal present in the charge floating on the molten slag layer is quickly liberated into the furnace atmosphere without being appreciably consumed by the smelting operation. The amount of crackable hydrocarbon used for this purpose is not critical, the carbon dioxide content of the furnace gases being progressively decreased by increasing amounts of crackable hydrocarbons introduced thereinto.

It will be appreciated, accordingly, that the smelting method of the present invention makes possible the recovery of all valuable constituents of a zinciferous ore. The zinc component of the ore is recovered in the form of a readily condensable zinc vapor which further contains cadmium and lead as in heretofore conventional zinc smelting practice. The cadmium and lead may be readily separated from the zinc in a fractional distillation-type refining column. Any copper, silver and gold present in the ore is recovered in the matte and may be separated therefrom pursuant to conventional copper refinery practice.

We claim:

1. The method of smelting a zinciferous ore with a solid carbonaceous reducing material in an electric arc furnace with the resulting production of a molten matte, a substantially zinc-free molten slag and metallic zinc vapor capable of being condensed predominantly to massive zinc metal, which comprises heating a body of said slag by an electric arc in direct contact with the slag and struck from an electrode which terminates above the upper surface of the slag to a temperature not in excess of 1450° C., introducing into the furnace a charge composed essentially of (1) an oxidized zinciferous ore containing significant amounts of iron and of at least one metal of the group consisting of copper, silver, and gold, (2) an amount of sulfur sufficient to form a matte with substantially all of the metal of said group and with at least a portion of the iron, and (3) an amount of the reducing material sufficient to reduce all of the zinc oxide, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, and smelting the charge above the body of molten slag by imparting smelting heat to said charge through its contact with the molten slag body and through radiation from the heating arc, whereby the slag resulting from said smelting is substantially free of readily-reducible oxides, except for the aforementioned iron oxide not sulfided by said sulfur, before it comes into direct contact with the heating arc.

2. The method of producing molten zinc metal directly from a zinciferous ore by smelting the ore with a solid carbonaceous reducing material in an electric arc furnace with the resulting production of a molten matte, a substantially zinc-free molten slag and metallic zinc vapor capable of being condensed predominantly to massive zinc metal, which comprises heating a body of said slag by an electric arc in direct contact with the slag and struck from an electrode which terminates above the upper surface of the slag to a temperature not in excess of 1450° C., introducing into the furnace a charge composed essentially of (1) an oxidized zinciferous ore containing significant amounts of iron and of at least one metal of the group consisting of copper, silver and gold, (2) an amount of sulfur sufficient to form a matte with substantially all of the metal of said group and with at least a portion of the iron, and (3) an amount of the reducing material sufficient to reduce all of the zinc oxide, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides, except for the aforementioned iron oxide not sulfided by said sulfur, before it comes into direct contact with the heating arc, and condensing the evolved zinc vapor to massive molten metal.

3. The method of producing molten zinc metal directly from a sulfide sulfur-containing oxidized zinciferous ore by smelting the ore with a solid carbonaceous reducing material in an electric arc furnace with the resulting production of a molten matte, a substantially zinc-free molten slag and metallic zinc vapor capable of being condensed predominantly to massive zinc metal, which comprises heating a body of said slag by an electric arc in direct contact with the slag and struck from an electrode which terminates above the upper surface of the slag to a temperature not in excess of 1450° C., introducing into the furnace a charge composed essentially of (1) a sulfide sulfur-containing oxidized zinciferous ore containing significant amounts of copper and iron and an amount of sulfur sufficient to form a matte with substantially all of the copper and with at least a portion of the iron content of the ore and (2) an amount of the reducing material sufficient to reduce all of the zinc oxide and at least a portion of that iron oxide not sulfided by said sulfur, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides, except for the aforementioned iron oxide not sulfided by said sulfur, before it comes into direct contact with the heating arc, and condensing the evolved zinc vapor to massive molten metal.

4. The method of producing molten zinc metal directly from an oxidized zinciferous ore by smelting the ore with a solid carbonaceous reducing material in an electric arc furnace with the resulting production of a molten matte, a substantially zinc-free molten slag and metallic zinc vapor capable of being condensed predominantly to massive zinc metal, which comprises heating a body of said slag by an electric arc in direct contact with the slag and struck from an electrode which terminates above the upper surface of the slag to a temperature not in excess of 1450° C., introducing into the furnace a charge composed essentially of (1) an oxidized zinciferous ore containing a significant amount of at least one metal of the group consisting of copper, silver and gold, (2) an amount of extraneous iron sulfide such as to provide sufficient sulfur to form a matte with all of the metal of said group and with at least a portion of the iron so introduced into the charge, and (3) an amount of the reducing material sufficient to reduce all of the zinc oxide and at least a portion of the iron not combined with said sulfur, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides, except for the aforementioned iron oxide not sulfided by said sulfur, before it comes into direct contact with the heating arc, and condensing the evolved zinc vapor to massive molten metal.

5. The method of producing molten zinc metal directly from a sulfidic copper- and iron-containing zinciferous ore by smelting the ore with a solid carbonaceous reducing material in an electric arc furnace with the resulting production of a molten matte, a substantially zinc-free molten slag and metallic zinc vapor capable of being condensed predominantly to massive zinc metal, which comprises heating a body of said slag by an electric arc in direct contact with the slag and struck from an electrode which terminates above the upper surface of the slag to a temperature not in excess of 1450° C., partially oxidizing the sulfidic ore so as to leave in the ore sufficient sulfur to form a matte with all of the copper and with at least a portion of the iron content of the ore, introducing into the furnace a charge composed essentially of said partially oxidized ore and an amount of the reducing material sufficient to reduce all of the zinc oxide and at least a portion of the remaining oxidized iron, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantialy free of readily-reducible oxides, except for the aforementioned iron oxide not sulfided by said sulfur, before it comes into direct contact with the heating arc, and condensing the evolved zinc vapor to massive molten metal.

6. The method of producing molten zinc metal directly from a zinciferous ore by smelting the ore with a solid carbonaceous reducing material in an electric arc furnace with the resulting production of a molten metallic iron product, a molten matte, a substantially zinc-free molten slag and metallic zinc vapor capable of being condensed predominantly to massive zinc metal, which comprises heating the body of said slag by an electric arc in direct contact with the slag and struck from an electrode which terminates above the upper surface of the slag to a temperature not in excess of 1450° C., introducing into the furnace a charge composed essentially of (1) an oxidized zinciferous ore containing significant amounts of iron and of at least one metal of the group consisting of copper, silver and gold, (2) an amount of sulfur sufficient to form a matte with substantially all of the metal of said group and with at least a portion of the iron, and (3) an amount of the reducing material sufficient to reduce all of the zinc oxide and such a portion of that iron which has not been sulfided as to form a body of molten metallic iron product, delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides, except for the aforementioned iron oxide not sulfided by said sulfur, before it comes into direct contact with the heating arc, and condensing the evolved zinc vapor to massive molten metal.

ERWIN C. HANDWERK.
LUTHER D. FETTEROLF.

REFERENCES CITED

The following references are of record in the file of this patent:

UNITED STATES PATENTS

| Number | Name | Date |
|---|---|---|
| 1,566,183 | Cornelius | Dec. 15, 1925 |
| 1,680,098 | Flodin et al. | Aug. 7, 1928 |
| 1,738,910 | Lepsoe | Dec. 10, 1929 |